Figure 1:
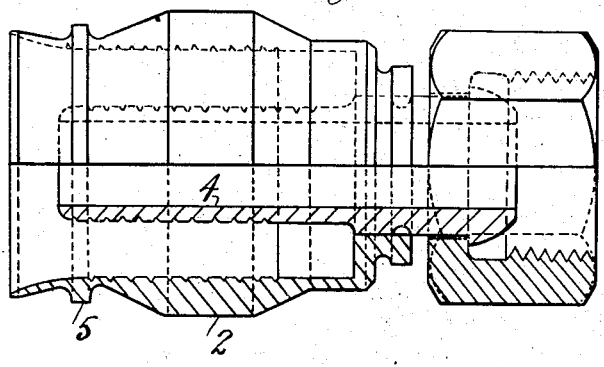

March 30, 1943.  W. A. MELSOM  2,314,890
FLEXIBLE HOSE COUPLING
Filed Feb. 7, 1941

INVENTOR
Walter Arthur Melsom

Albert F. Nathan
ATTORNEY

Patented Mar. 30, 1943

2,314,890

UNITED STATES PATENT OFFICE 2,314,890

FLEXIBLE HOSE COUPLING

Walter Arthur Melsom, London, England, assignor to Bowden (Engineers) Limited, London, England, a British company Application February 7, 1941, Serial No. 377,814
In Great Britain April 11, 1940

6 Claims. (Cl. 285—84)

The present invention relates to improvements in flexible hose couplings of the kind in which a sleeve of material suited to contraction such as brass, duralumin, low carbon steel, or phosphor bronze, clamps a flexible hose onto an inner rigid insert which may be of the same material, hereinafter termed insert, couplings of this kind being suitable for and more particularly intended for use with medium and high pressure hoses such as are employed for the conveyance of gases, liquids, semi-solids or viscous substances under pressure.

Hoses of flexible material normally employed for medium and high pressure use, by which in general is meant medium pressures of from 500 to 2,000 lbs. per sq. inch and higher pressures up to 15,000 or 20,000 lbs. per sq. inch, are generally constructed of rubber or other resilient material reinforced by an embedded or interlined or inserted single layer or multiple layers of braiding, one or two such embedded or interlined layers generally being employed and the material of the reinforcement being of canvas, steel wire or other metallic wire according to the duty which the hose has to undertake.

In forming a coupling component for such hose, the end of the hose is usually inserted into the sleeve up to an end wall thereof at the outer end of the coupling, and the insert is introduced into the bore of the hose, whereafter the sleeve is radially contracted upon the hose by appropriate swaging or contracting methods so as to grip it powerfully between the sleeve and the insert.

These couplings may be made from one or more pieces according to the methods of fixation and construction employed, but whatever these methods may be, the successful fixation of the coupling to the hose is primarily dependent on creating a zone of intense pressure between the sleeve and the insert within which zone the hose is powerfully gripped.

I have found that if uniform and intense pressure is applied to the whole length of the hose gripped between the sleeve and the insert, so that flexure of the hose takes place about a point subjected to such intense pressure, frequent flexure of the hose about such zone of intense pressure causes the vulcanising union of the inner rubber layers to the inserted braiding to break down and thus permit relative movement to take place between these layers and the braiding which quickly leads to the failure of the hose by weakening or puncturing thereof.

Moreover if the pressure is allowed to fall off gradually towards the end of the insert there is a tendency for the rubber of the hose to be forced out to some extent from the compressed part, which also has deleterious effects.

One object of this invention is to reduce the liability for the hose to flex about a part subjected to intense pressure.

Another object of the present invention is to avoid an abrupt release of pressure from the zone of intense pressure and to provide a separate pressure zone which also acts as a throttle which restricts the said tendency for the rubber to flow out.

Another object of the invention is to provide separate pressure zones and to ensure that extra metal will be available locally just where the primary pressure zone and the additional pressure zone are required.

Figure 2:
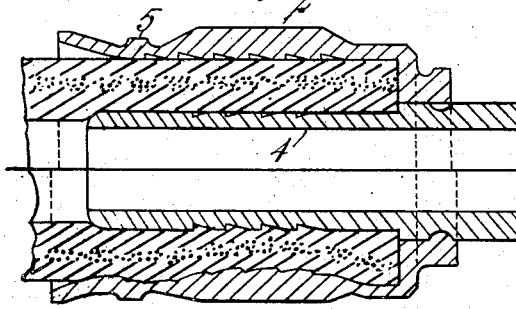
Figure 3:
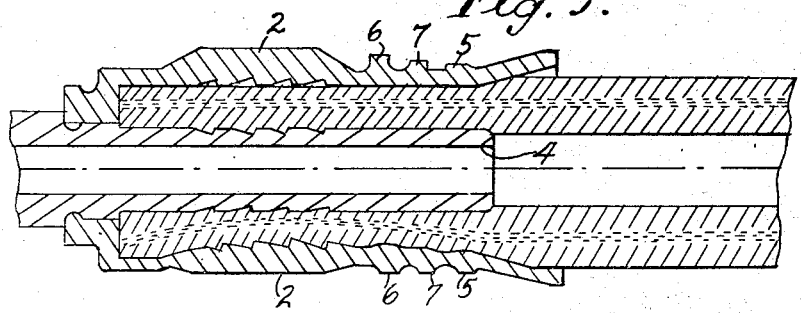

In order that the invention may be more readily understood we refer to the accompanying drawing in which Fig. 1 shows partly in section the sleeve and insert united together and carrying a swivel nut and Fig. 2 is a sectional view with the hose in position, the top half of the figure showing the hose before being compressed and the lower half showing the condition of the parts when the contraction of the sleeve has been effected. The serrating of the sleeve and insert and the form of the outer end of the insert shown in Fig. 2 is rather different from those shown in Fig. 1, the coupling nut being rotatably mounted on the insert in the manner described in our copending applications Nos. 336,367 and 336,368. Fig. 3 is a sectional view similar to Fig. 2 of a modified form of the invention.

The sleeve comprises an integral local externally thickened part 2 which I term the primary band and this band is swaged or contracted inwards to create a zone of intense constriction and thereby powerfully grip the hose onto the insert 4. To this primary fixation we lay no claim per se.

The sleeve is of circumferentially continuous form and the enlarged or thickened primary band has its maximum diameter situated medially of the ends of the sleeve, so that when the sleeve is contracted on the insert, preferably by radially closing dies, this band produces a primary zone of intense pressure whose maximum is produced medially of such ends.

I also provide the sleeve with a separate integral externally thickened portion 5, of narrower width than the primary band and initially of lesser diameter than the first band, see Fig. 1.

This secondary band is of such a character and is so located along the sleeve and nearer the end into which the hose is inserted that when contracted it will produce a lesser constriction approximately in line with the point or tail end of the insert, its greater compressive force being exerted upon the hose end just before the end of the insert is reached. I prefer to form the secondary band as shown with a steep wall on the side towards the primary band.

The pressure zones are not exactly confined to the lengths of the bands provided by the thickened portions, and the secondary zone may merge into the elongated pressure zone produced by the primary band, but nevertheless, produces a rise of pressure near to the end of the insert.

The primary band is preferably tapered off towards the secondary band and also towards the outer end of the sleeve, i. e., that nearest the joint.

The medial position of the maximum zone of pressure permits of the flow of rubber displaced by the intense primary pressure, in the direction of such outer end thus improving the joint and limiting the flow towards the open end of the sleeve.

The inner end of the sleeve preferably terminates with a radius or better still as shown with a tapering portion which is flared and this allows of the hose to bend about the sleeve without bearing upon a sharp edge of the sleeve and therefore reduces the liability for the hose to rupture or abrade at this region. Such flare may be omitted in certain forms of couplings the subject of the present invention where the inherent stiffness of the hose does not require precaution to be taken against external abrasion, abrasion of the hose bore or damage to the reinforcing braiding being in general much more serious in its effects.

I find that when as shown in the drawing, the secondary band is produced by a locally thickened part and the sleeve is about at its thinnest on each side of such band, the flare does not unduly distort in the swaging process.

The construction described has many further advantages. Firstly it provides a considerable thickness of sleeve material at the parts where the pressure is greatest thereby contributing to the strength of the component. Secondly it does not involve complicated methods of manufacture, and thirdly the secondary zone of pressure can be used to check the outward flow of the rubber when forming or completing the primary pressure zone as more particularly described in my copending application Serial No. 396,397 filed June 3, 1941, which method I prefer to employ in making the coupling according to this invention.

Although I have described two swaging bands there may be cases as depicted in Fig. 3, in which it is desirable to introduce one or more further bands between the aforesaid primary and secondary bands, two such bands 6 and 7 being shown, the pressure exerted on the hose by the series of bands preferably progressively lessening in intensity from the primary band 2 to the band 5 which encircles the inner end of the insert. The additional externally thickened bands 6, 7 are initially of progressively less external diameter from the primary band to the inner band and when compressed produce with the primary and the inner band a succession of separate pressure rings decreasing in intensity from the primary band to the inner band.

Each band may be continuous or may be subdivided into a plurality of bands.

What I claim is:
1. A hose coupling component suitable for use with medium or high pressure hoses comprising a flexible hose, and a circumferentially continuous sleeve and an insert between which said hose is contracted and gripped, said sleeve being formed with an integral thickened band which has its maximum thickness situated medially of the ends of the sleeve and which produces a primary zone of intense constriction medially of such ends, said sleeve having an integral second thickened band separate from said first band which produces a separate zone of secondary constriction whose maximum is less than that of the first zone, such second band being situate around the insert and approximately opposite to the end thereof.

2. A hose coupling component as in claim 1, in which the external diameter of the primary band and the external diameter of the secondary band are equal.

3. A hose coupling component suitable for use with medium or high pressure hoses comprising a flexible hose and a circumferentially continuous sleeve and an insert between which said hose is contracted and gripped, said sleeve being formed with an integral thickened band which has its maximum thickness situated medially of the ends of the sleeve and which produces a primary zone of intense constriction medially of such ends, said sleeve having an integral second thickened band defining a steep external wall and separated from said primary band by a portion of the sleeve which externally gradually tapers from the primary band to the bottom of said wall, said second band being of less thickness than said first band and producing a separate zone of secondary constriction whose maximum is less than that of the first zone, such second band being situate around the insert and approximately opposite to the end thereof.

4. A hose coupling according to claim 3, in which the sleeve also has a portion which gradually tapers inwards from the primary band towards the end of the sleeve remote from the second thickened band.

5. A hose coupling component suitable for use with medium or high pressure hoses comprising a flexible hose and a circumferentially continuous sleeve and an insert between which said hose is contracted and gripped, said sleeve being formed with an integral thickened band which has its maximum thickness situated medially of the ends of the sleeve and which produces a primary zone of intense constriction medially of such ends, said sleeve having an integral second thickened band separate from and of less thickness than said first band which produces a separate zone of secondary constriction whose maximum is less than that of the first zone, such second band being situate around the insert and approximately opposite to the end thereof, and the inner end of the sleeve being flared beyond the second thickened band at least the main part of said flare extending beyond the inner end of the insert.

6. A hose coupling component suitable for use with medium or high pressure hoses comprising a flexible hose and a circumferentially continuous sleeve and an insert between which said hose is contracted and gripped, said sleeve being formed with an integral thickened band which has its maximum thickness situated medially of the ends of the sleeve and which produces a primary zone of intense constriction medially of such ends, said sleeve having an integral second thickened band separate from and of less thickness than said first band which produces a separate zone of secondary constriction whose maximum is less than that of the first zone, such second band being situate around the insert and approximately opposite to the end thereof, said sleeve having at least one further integral thickened band separate from said primary and secondary bands, the thickness of the separate successive bands and the magnitude of the separate successive rings of maximum constriction produced thereby being progressively less from the primary band to the secondary band.

WALTER ARTHUR MELSOM.